(12) United States Patent
Xiong et al.

(10) Patent No.: US 10,776,306 B2
(45) Date of Patent: Sep. 15, 2020

(54) SERIAL PORT COMMUNICATION MODE CONVERSION METHOD, SYSTEM, AND CIRCUIT

(71) Applicant: UBTECH Robotics Corp, Shenzhen (CN)

(72) Inventors: Youjun Xiong, Shenzhen (CN); Jialong Kuang, Shenzhen (CN); Rui Gu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 50 days.

(21) Appl. No.: 16/232,056

(22) Filed: Dec. 26, 2018

(65) Prior Publication Data

US 2019/0347237 A1 Nov. 14, 2019

(30) Foreign Application Priority Data

May 8, 2018 (CN) .......................... 2018 1 0430905

(51) Int. Cl.
*G06F 13/42* (2006.01)
*H04L 5/16* (2006.01)

(52) U.S. Cl.
CPC ............ *G06F 13/4282* (2013.01); *H04L 5/16* (2013.01); *G06F 2213/0002* (2013.01)

(58) Field of Classification Search
CPC .......... H04L 5/14; H04L 5/16; G06F 13/4282
See application file for complete search history.

(56) References Cited

U.S. PATENT DOCUMENTS

| | | | | |
|---|---|---|---|---|
| 7,274,916 B2 * | 9/2007 | Al-Shyoukh | ....... | H03F 3/45076 327/103 |
| 7,802,044 B2 * | 9/2010 | Chien | .................... | G06F 13/385 710/301 |
| 8,713,598 B2 * | 4/2014 | Nakajima | .............. | H04N 5/775 715/723 |
| 9,063,751 B2 * | 6/2015 | Grewal | ................. | G06F 9/4406 |
| 9,391,680 B2 * | 7/2016 | Le-Ngoc | ............... | H04B 7/0456 |
| 9,785,591 B2 * | 10/2017 | Jeon | ...................... | G06F 13/385 |
| 9,785,595 B2 * | 10/2017 | Barus | .................. | G06F 13/4027 |
| 9,965,418 B2 * | 5/2018 | Noguchi | ................. | G06F 13/36 |
| 10,498,522 B2 * | 12/2019 | Ogawa | .................... | H04L 67/12 |
| 2002/0167949 A1 * | 11/2002 | Bremer | ..................... | H04L 5/14 370/395.1 |

FOREIGN PATENT DOCUMENTS

CN 103294629 A 9/2013

* cited by examiner

*Primary Examiner* — Brian T Misiura (57) ABSTRACT

The present disclosure provides a serial port communication mode conversion method, system, and circuit for a serial port circuit, in which the serial port circuit includes a first serial port and a second serial port, a transmission signal line of the first serial port and a reception signal line of the second serial port are connected to form a half-duplex signal line. The method includes: configuring the second serial port to enable after a preset time; controlling the first serial port to transmit a control signal to an external device through the half-duplex signal line within the preset time; and controlling the second serial port to receive response data transmitted by the external device through the half-duplex signal line after the preset time. The present disclosure realizes the conversion of the full-duplex serial port to the half-duplex serial port.

12 Claims, 6 Drawing Sheets

SERIAL PORT COMMUNICATION MODE CONVERSION METHOD, SYSTEM, AND CIRCUIT

CROSS REFERENCE TO RELATED APPLICATIONS

This application claims priority to Chinese Patent Application No. 201810430905.0, filed May 8, 2018, which is hereby incorporated by reference herein as if set forth in its entirely.

BACKGROUND

1. Technical Field

The present disclosure relates to communication technology, and particularly to a serial port communication mode conversion method, system, and circuit.

2. Description of Related Art

The development of electronic devices tends to miniaturization and high integration, and the area of PCB (printed circuit board) is getting smaller and smaller. Full-duplex is the most common operation manner for serial ports, but in some cases such as digital servos or other half-duplex devices, single wired half-duplex serial port is required. The characteristic of half-duplex is that it has only one line, and the reception and transmission cannot be performed at the same time, while most of the single-chip microcomputers merely supports duplex serial ports, and a serial port converted chip is usually required to control half-duplex digital servos, which affects the reception speed and transmission speed since they will be limited by the conversion speed of the chip, and increases the area of the PCB and the hardware cost.

In summary, in the prior art, when converting between a full-duplex serial port and a half-duplex serial port, a serial port converter chip needs to be added, which reduces reception and transmission speeds and increases circuit area and hardware cost.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

The term "comprising", "including" and any other variations in the specification and claims of the present disclosure and the above-mentioned drawings mean "including but not limited to", and is intended to cover non-exclusive inclusion. For example, a process, method, system, product, or device including a series of steps or units is not limited to the listed steps or units, but optionally also includes steps or units not listed, or alternatively also includes other steps or units inherent to these processes, methods, products, or device. Moreover, the terms "first", "second", "third", and the like are used to distinguish different objects, and are not intended to describe a particular order.

For the purpose of describing the technical solutions of the present disclosure, the following describes through specific embodiments.

Embodiment 1

Figure 1:
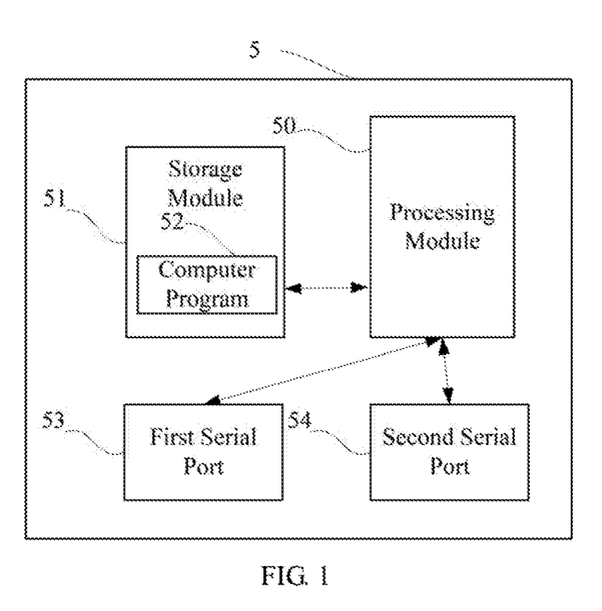
FIG. 1 is a schematic block diagram of an embodiment of a serial port communication mode conversion circuit according to the present disclosure.

FIG. 1 is a schematic block diagram of an embodiment of a serial port communication mode conversion circuit according to the present disclosure. As shown in FIG. 1, the circuit 5 of this embodiment includes a processing module 50, a storage module 51, a computer program 52 stored in the storage module 51 and executable on the processing module 50, a first serial port 53, and a second serial port 54. When executing (instructions in) the computer program 52, the processing module 50 implements the steps in the above-mentioned Embodiment 3, for example, steps S101-S103 shown in FIG. 4. Alternatively, when the processing module 50 executes the (instructions in) computer program 52, the processing module 50 implements the functions of each module/unit in the above-mentioned embodiment 2, for example, the functions of the modules 110-130 shown in FIG. 2. The a first serial port 53 includes a transmission signal line, and the second serial port 54 includes a reception signal line, in which the transmission signal line of the first serial port 53 and the reception signal line of the second serial port 54 are connected to form a half-duplex signal line.

Figure 2:
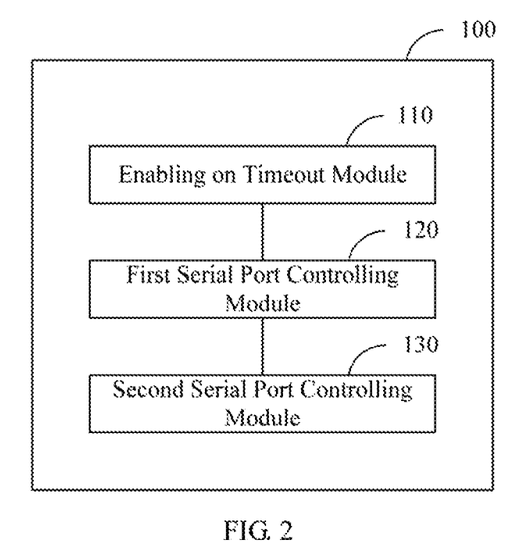
FIG. 2 is a schematic block diagram of an embodiment of a serial port communication mode conversion system according to the present disclosure.

It can be understood by those skilled in the art that FIG. 2 is merely an example of the circuit 5 and does not constitute a limitation on the circuit 5, and may include more or fewer components than those shown in the figure, or a combination of some components or different components. For example, the circuit 5 may further include an input/output device, a network access device, a bus, and the like.

The processing module 50 may be a central processing unit (CPU), or be other general purpose processing circuit such as a digital signal processor (DSP), an application specific integrated circuit (ASIC), a field-programmable gale array (FPGA), or be other programmable logic device, a discrete gate, a transistor logic device, and a discrete hardware component.

The storage module 51 may be an internal storage unit of the circuit 5, for example, a memory of the circuit 5. The storage module 51 may also be an external storage device of the circuit 5, for example, a plug-in hard disk, a smart media card (SMC), a secure digital (SD) card, flash card, and the like, which is equipped on the circuit 5. Furthermore, the storage module 51 may further include both an internal storage unit and an external storage device, of the circuit 5. The storage module 51 is configured to store the computer program 52 and other programs and data required by the circuit 5. The storage module 51 may also be used to temporarily store data that has been or will be output.

Embodiment 2

FIG. 2 is a schematic block diagram of an embodiment of a serial port communication mode conversion system according to the present disclosure. As shown in FIG. 2, in this embodiment, a serial port communication mode conversion system 100 is provided, which is configured to perform the steps in the method of the embodiment corresponding to FIG. 4, and is implemented based on a serial port circuit, where the serial port circuit includes a first serial port and a second serial port, a transmission signal line of the first serial port and a reception signal line of the second serial port are connected by, for example, common contact to form a half-duplex signal line.

The serial port communication mode conversion system 100 includes:

an enabling on timeout module 110 configured to configure the second serial port to enable after a preset time;

a first serial port controlling module 120 configured to control the first serial port to transmit a control signal to an external device through the half-duplex signal line within the preset time; and a second serial port controlling module 130 configured to control the second serial port to receive response data transmitted by the external device through the half-duplex signal line after the preset time.

Figure 3:
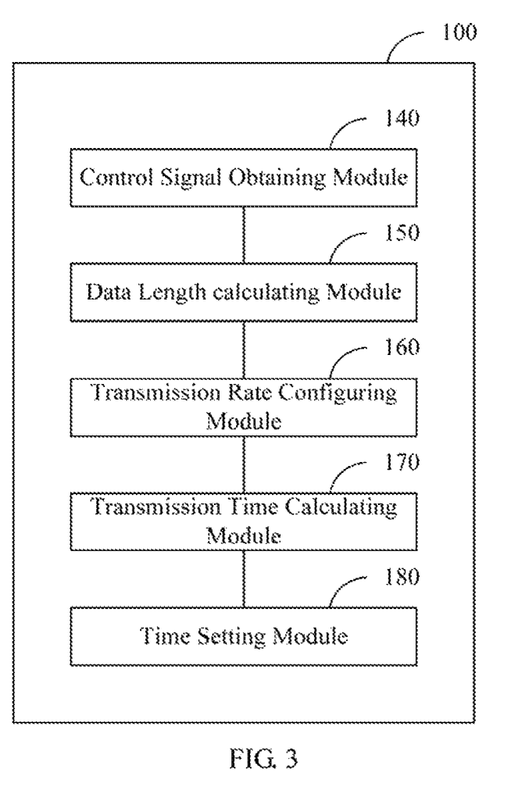
FIG. 3 is a schematic block diagram of another embodiment of a serial port communication mode conversion system according to the present disclosure.

FIG. 3 is a schematic block diagram of another embodiment of a serial port communication mode conversion system accenting to the present disclosure. As shown in FIG. 3, in this embodiment, the serial port communication mode conversion system 100 further includes other components for performing the steps in the method of the embodiment corresponding to FIG. 5:

a control signal obtaining module 140 configured to obtain the control signal to be transmitted;

a data length calculating module 150 configured to calculate a data length of the control signal;

a transmission rate configuring module 160 configured to configure a transmission rate of the first serial port;

a transmission time calculating module 170 configured to obtain a transmission time of the control signal based on the transmission rate of the first serial port and the data length of the control signal; and a time setting module 180 configured to set the transmission time of the control signal as the preset time.

In one embodiment, the first serial port controlling module 120 includes:

a first serial port enabling unit configured to enable the first serial port;

a first serial port transmission unit configured to control the first serial port to transmit the control signal through the transmission signal line; and a first serial port disabling unit configured to disable the first serial port.

In one embodiment, the second serial port controlling module 130 includes:

a second serial port reception unit configured to control the second serial port to receive the response data through the reception signal line; and a second serial port disabling unit configured to disable the second serial port.

Each of the above-mentioned modules/units may be implemented in the form of hardware (e.g., a circuit), software (e.g., a program), or a combination thereof (e.g., a circuit with a single chip microcomputer).

It will be clearly understood by those skilled in the art that for the convenience and brevity of the description, only the division of each functional module described above is exemplified. In practical applications, the above-mentioned function assignment can be completed by different functional modules as needed, that is, the internal structure of the serial communication mode conversion system 100 is divided into different functional modules to perform all or part of the functions described above. Each functional module in the embodiment may be integrated into one processing unit, or each unit may exist physically separately, or two or more units may be integrated into one unit, and the integrated module may be implemented in the form of hardware. It can also be implemented in the form of a software functional unit. In addition, the specific names of the respective functional modules are only for the purpose of facilitating mutual differentiation, and are not intended to limit the scope of protection of the present application. For the specific working process of the module in the communication mode conversion system 100 of the serial port, refer to the corresponding process in Embodiment 3, and details are not described herein again.

Embodiment 3

Figure 4:
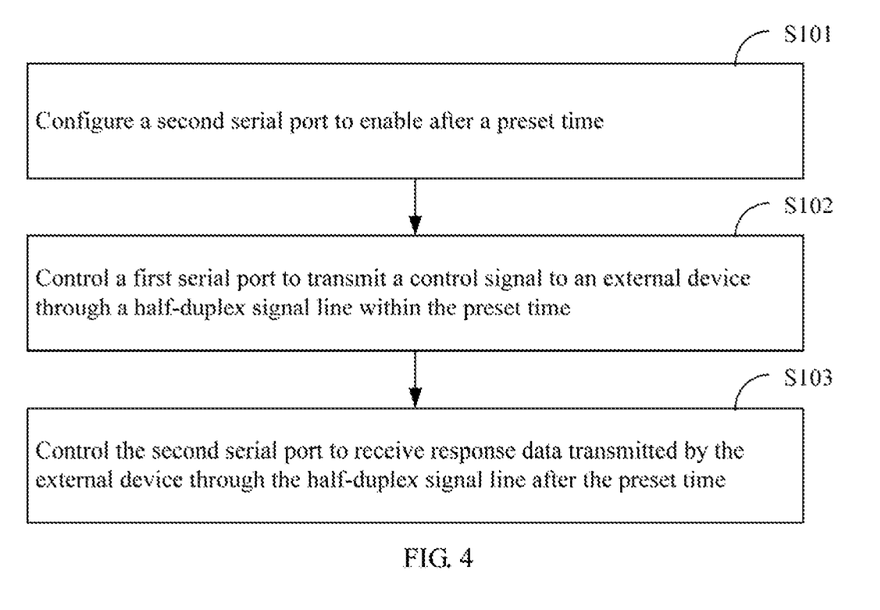
FIG. 4 is a flow chart of an embodiment of a serial port communication mode conversion method according to the present disclosure.

FIG. 4 is a flow chart of an embodiment of a serial port communication mode conversion method according to the present disclosure. For convenience of description, only parts related to this embodiment are shown, which are described in detail as follows.

In this embodiment, the serial port communication mode conversion method is implemented by using a serial port circuit, where the serial port circuit includes a first serial port and a second serial port, a transmission signal line of the first serial port and a reception signal line of the second serial port are connected by, for example, common contact (i.e., connecting by shorting) to form a half-duplex signal line. The method is a computer-implemented method executable for a processor, which may be implemented through a serial port communication mode conversion apparatus for a serial port circuit.

In one embodiment, the serial port circuit is connected to a half-duplex serial port of an external device through the half-duplex signal line.

As shown in FIG. 4, the method includes the following steps.

S101: configuring the second serial port to enable after a preset time.

In this embodiment, by configuring the second serial port to enable after the preset time, such that the second serial port is enabled after the first serial port completes the transmission so as to prevent the two serial ports from being enabled simultaneously.

S102: controlling the first serial port to transmit a control signal to the external device through the half-duplex signal line within the preset time.

In one embodiment, after the first serial port completes the transmission of the control signal, the first serial port is disabled.

In this embodiment, the first serial port has to transmit the control signal within the preset time, otherwise it will affect the data reception in the next step.

S103: controlling the second serial port to receive response data transmitted by the external device through the half-duplex signal line after the preset time.

In one embodiment, after the first serial port completes the transmission of the control signal, that is, after the preset time, the second serial port is enabled, and then the response data is received through the second serial port.

In this embodiment, the main body of the execution of the method may be a processor having at least two serial interfaces or multiple serial interfaces. The processor refers to a component or device having the capabilities of data processing and controlling, which includes but not limited to, a single-chip microcomputer, an FPGA (field-programmable gate array), a SOPC (system-on-a-programmable-chip), and an ARM (advanced RISC machine) processor.

The specific embodiments of the processor are listed above in detail, and those skilled in the art will comprehend that the processor is not limited to the above-mentioned examples.

In another embodiment, the processor may be an integrated circuit chip, which adopts the very large scale integrated circuit technology to integrate a central processing unit CPU with data processing capability, a random access memory (RAM), a read only memory (ROM), various communication interfaces and interrupt systems, and a timer/counter, and may include circuits such as display drive circuit, pulse width modulation circuit, analog multiplexers, A/D converters, so as to integrate the above components into a wafer to compose a small and complete microcomputer system. The processor typically includes a plurality of full-duplex serial interfaces that form a serial port circuit. In the other embodiment, the processor may be disposed on a circuit with full-duplex serial interfaces.

Some types of external device such as digital servo needs to use half-duplex communication. Since the full-duplex serial port disposed on the processor or a circuit with the processor is incompatible with the half-duplex serial port disposed on the external device, this embodiment provides a solution to solve the problem of the conversion between a full-duplex serial port and a half-duplex serial port.

Full-duplex communication means that data can be received while transmitting data, in which the two are performed synchronously. The full-duplex serial port has two communication lines, which are respectively a transmission signal line and a reception signal line.

Half-duplex communication indicates a transmission mode in which a carrier channel is shared by data transmission and data reception while data can only be either transmitted or received at a time. A half-duplex serial port generally has only one communication line which can be referred to as a half-duplex signal line.

In this embodiment, the transmission signal line of the first serial port is connected to the reception signal line of the second serial port by shorting. Through controlling the enabled time of the second serial port, the second serial port can be enabled merely after the transmission of the first serial port is completed. The first serial port merely transmits the control signal to the external device, and the second serial port merely receives the response data transmitted by the external device, which realize the conversion of the full-duplex serial port to the half-duplex serial port, and completes the function of half-duplex communication, thereby realizing the conversion between the two communication modes of full-duplex and half-duplex without adding additional hardware circuit, while improving the reception and transmission efficiency, increasing the utilization of board area, and reducing the cost.

Figure 5:
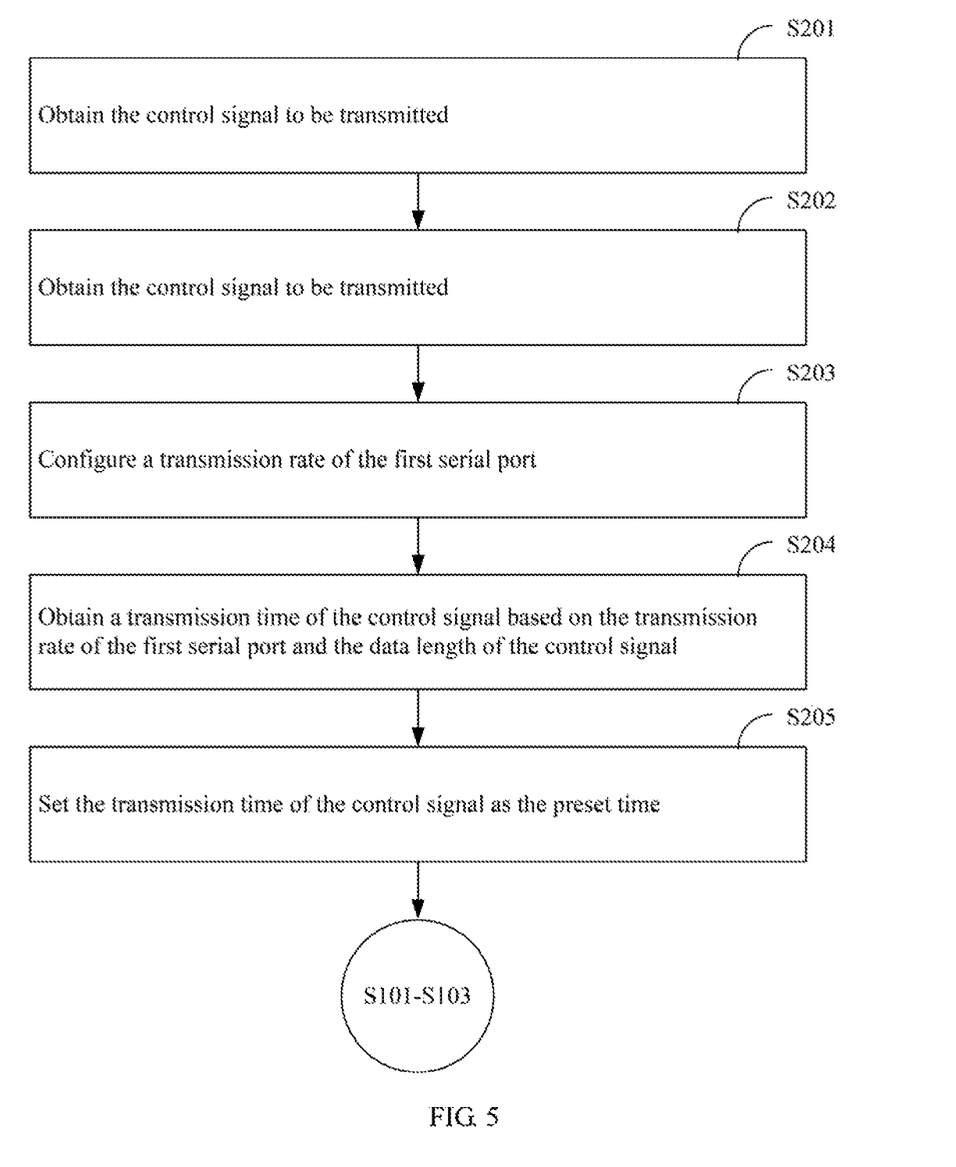
FIG. 5 is a flow chart of another embodiment of a serial port communication mode conversion method according to the present disclosure.

FIG. 5 is a flow chart of another embodiment of a serial port communication mode conversion method according to the present disclosure. As shown in FIG. 5, in this embodiment, before step S101 as the above-mentioned method, the method further includes the following steps:

S201: obtaining the control signal to be transmitted.

S202: calculating a data length of the control signal.

In one embodiment, the data length of the control signal is a byte length, or a code length, or the like.

S203: configuring a transmission rate of the first serial port.

S204: obtaining a transmission time of the control signal based on the transmission rate of the first serial port and the data length of the control signal.

S205: setting the transmission time of the control signal as the preset time.

In this embodiment, through calculating the transmission time of the first serial port to transmit the control signal to the external device, and setting the preset time to enable the second serial port as the transmission time, it realizes that the second serial port is enabled to receive data after the first serial port completes the transmission, and the second serial port is prevented from receiving the signal transmitted by the first serial port through the half-duplex signal line. The half-duplex communication is realized by switching between the first serial port and the second serial port.

In one embodiment, step S102 includes:
1) enabling the first serial port;
2) controlling the first serial port to transmit the control signal through the transmission signal line; and
3) disabling the first serial port.

In this embodiment, after the first serial port is enabled, the control signal is transmitted to the external device through the first serial port, and the first serial port is disabled after the transmission is completed.

In one embodiment, step S103 includes:
1) controlling the second serial port to receive the response data through the reception signal line;
2) disabling the second serial port.

In this embodiment, after the first serial port is disabled, the second serial port is enabled. The response data is received through the second serial port, and the second serial port is disabled after the reception is completed.

In this embodiment, through switching between the first serial port and the second serial port, the two serial ports can be controlled to enable and disable, so that data is transmitted and received according to a preset timing, thereby avoiding communication confusion.

Figure 6:
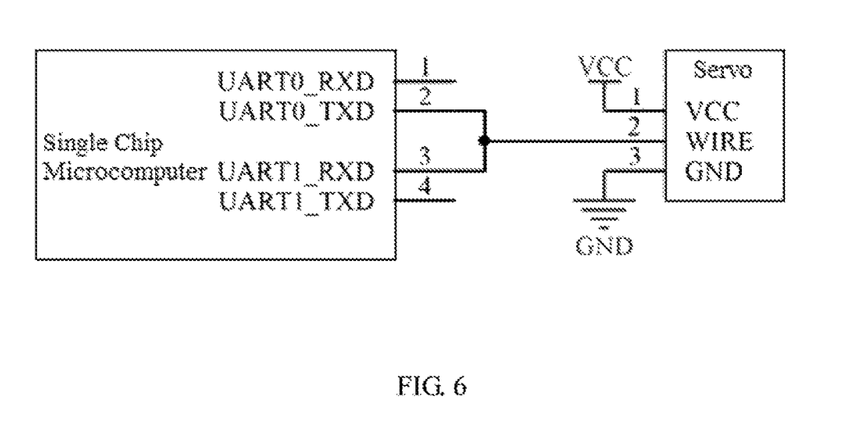
FIG. 6 is a schematic diagram of a half-duplex signal line according to an embodiment the present disclosure.

FIG. 6 is a schematic diagram of a half-duplex signal line according to an embodiment the present disclosure. As shown in FIG. 6, taking a specific application scenario as an example, the single-chip microcomputer includes two serial ports, which are respectively a serial port UART0 and a serial port UART1. UART0_TXD (i.e., the transmission signal line) and UART1_RXD (i.e., the reception signal line)

are connected as a half-duplex signal line by shorting to a signal line WIRE of a servo, and then half-duplex communication is realized by a program which implements the switching and the serial port transmission prohibiting, where UART0 is only for transmission, and UART1 is only for reception.

In the program, the serial port UART1 is configured to enable on timeout first, where the timeout time is the signal transmission time. Then, the serial port UART0 is enabled, and the control signal is transmitted through UART0_TXD. After the serial port UART0 completes the transmission, the serial port UART0 is disabled. And then, the response data is received via UART1_RXD, the serial port UART1 is disabled after the reception is completed. In such manner, the function of half-duplex communication can be performed.

This embodiment can be applied to most single-chip microcomputers with multiple serial ports, which realizes the conversion of the full-duplex serial port to the half-duplex serial port without adding additional hardware circuit, so that the reception and transmission efficiency can be improved, and the circuit can be more compact, small, and exquisite, thereby reducing hardware cost.

It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment 4

The present disclosure further provides a computer readable storage medium storing a computer program. When the computer program is executed by a processor, the steps in the above-mentioned embodiment 3, for example, steps S101-S103 shown in FIG. 4 are implemented. Alternatively, when the computer program is executed by a processor, the function of each module/unit in the above-mentioned embodiment 2, for example, the functions of the modules 110-130 shown in FIG. 2 are implemented.

The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

The steps in the method of the embodiments of the present closure may be adjusted in the sequence, merged, and deleted according to actual needs.

The modules or units in the system of the embodiments of the present closure may be combined, divided, and deleted according to actual needs.

Those ordinary skilled in the art may clearly understand that, the exemplificative units and steps described in the embodiments described herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the described system/circuit and method may be implemented in other manners. For example, the above-mentioned system/circuit embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented serial port communication mode conversion method for a serial port circuit, wherein the serial port circuit comprises a first serial port and a second serial port, a transmission signal line of the first serial port and a reception signal line of the second serial port are connected to form a half-duplex signal line, the method comprises executing on a processor the steps of:
   obtaining a control signal to be transmitted;
   calculating a data length of the control signal;
   configuring a transmission rate of the first serial port;
   obtaining a transmission time of the control signal based on the transmission rate of the first serial port and the data length of the control signal;
   setting the transmission time of the control signal as a preset time;
   configuring the second serial port to enable after the preset time;
   controlling the first serial port to transmit the control signal to an external device through the half-duplex signal line within the preset time; and controlling the second serial port to receive response data transmitted by the external device through the half-duplex signal line after the preset time.

2. The method of claim 1, wherein the step of controlling the first serial port to transmit the control signal to the external device through the half-duplex signal line within the preset time comprises:
enabling the first serial port;
controlling the first serial port to transmit the control signal through the transmission signal line; and
disabling the first serial port.

3. The method of claim 1, wherein the step of controlling the second serial port to receive the response data transmitted by the external device through the half-duplex signal line comprises:
controlling the second serial port to receive the response data through the reception signal line; and
disabling the second serial port.

4. The method of claim 1, wherein the serial port circuit is connected to a half-duplex serial port of the external device through the half-duplex signal line.

5. A serial port communication mode conversion system for a serial port circuit, wherein the serial port circuit comprises a first serial port and a second serial port, a transmission signal line of the first serial port and a reception signal line of the second serial port are connected to form a half-duplex signal line, the system comprises:
an enabling on timeout module configured to configure the second serial port to enable after a preset time;
a first serial port controlling module configured to control the first serial port to transmit a control signal to an external device through the half-duplex signal line within the preset time;
a second serial port controlling module configured to control the second serial port to receive response data transmitted by the external device through the half-duplex signal line after the preset time;
a control signal obtaining module configured to obtain the control signal to be transmitted;
a data length calculating module configured to calculate a data length of the control signal;
a transmission rate configuring module configured to configure a transmission rate of the first serial port;
a transmission time calculating module configured to obtain a transmission time of the control signal based on the transmission rate of the first serial port and the data length of the control signal; and
a time setting module configured to set the transmission time of the control signal as the preset time.

6. The system of claim 5, wherein the first serial port controlling module comprises:
a first serial port enabling unit configured to enable the first serial port;
a first serial port transmission unit configured to control the first serial port to transmit the control signal through the transmission signal line;
a first serial port disabling unit configured to disable the first serial port.

7. The system of claim 5, wherein the second serial port controlling module comprises:

a second serial port reception unit configured to control the second serial port to receive the response data through the reception signal line; and
a second serial port disabling unit configured to disable the second serial port.

8. The system of claim 5, wherein the serial port circuit is connected to a half-duplex serial port of the external device through the half-duplex signal line.

9. A serial port communication mode conversion circuit comprising:
a first serial port comprising a transmission signal line;
a second serial port comprising a reception signal line, wherein the transmission signal line of the first serial port and the reception signal line of the second serial port are connected to form a half-duplex signal line;
a storage module;
a processing module; and
one or more computer programs stored in the storage module and executable on the processing module, wherein the one or more computer programs comprise:
instructions for obtaining a control signal to be transmitted;
instructions for calculating a data length of the control signal;
instructions for configuring a transmission rate of the first serial port;
instructions for obtaining a transmission time of the control signal based on the transmission rate of the first serial port and the data length of the control signal;
instructions for setting the transmission time of the control signal as a preset time;
instructions for configuring the second serial port to enable after the preset time;
instructions for controlling the first serial port to transmit the control signal to an external device through the half-duplex signal line within the preset time; and
instructions for controlling the second serial port to receive response data transmitted by the external device through the half-duplex signal line after the preset time.

10. The circuit of claim 9, wherein the instructions for controlling the first serial port to transmit the control signal to the external device through the half-duplex signal line within the preset time comprises:
instructions for enabling the first serial port;
instructions for controlling the first serial port to transmit the control signal through the transmission signal line; and
instructions for disabling the first serial port.

11. The circuit of claim 9, wherein the instructions for controlling the second serial port to receive the response data transmitted by the external device through the half-duplex signal line comprises:
instructions for controlling the second serial port to receive the response data through the reception signal line; and
instructions for disabling the second serial port.

12. The circuit of claim 9, wherein the circuit is connected to a half-duplex serial port of the external device through the half-duplex signal line.

* * * * *